(12) United States Patent
Takahashi

(10) Patent No.: US 11,599,314 B2
(45) Date of Patent: Mar. 7, 2023

(54) PRINTING WITHOUT USING PRINTER SPECIFIC SOFTWARE

(71) Applicant: CANON KABUSHIKI KAISHA, Tokyo (JP)

(72) Inventor: Kouichi Takahashi, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 27 days.

(21) Appl. No.: 17/157,193

(22) Filed: Jan. 25, 2021

(65) Prior Publication Data
US 2021/0240414 A1    Aug. 5, 2021

(30) Foreign Application Priority Data
Jan. 31, 2020  (JP) .............................. JP2020-015180

(51) Int. Cl.
*G06F 3/12*   (2006.01)
*H04L 67/51*  (2022.01)

(52) U.S. Cl.
CPC .......... *G06F 3/1226* (2013.01); *G06F 3/1206* (2013.01); *G06F 3/126* (2013.01); *G06F 3/1247* (2013.01); *G06F 3/1274* (2013.01); *G06F 3/1286* (2013.01); *G06F 3/1293* (2013.01); *H04L 67/51* (2022.05)

(58) Field of Classification Search
None
See application file for complete search history.

(56) References Cited

U.S. PATENT DOCUMENTS

| 2009/0059272 | A1  | 3/2009  | Matsushita et al. |
| 2013/0094045 | A1  | 4/2013  | Nakata |
| 2013/0301077 | A1* | 11/2013 | Rocas ................... G06F 3/1292 |
|              |     |         | 358/1.15 |
| 2016/0274843 | A1* | 9/2016  | Kumagai ............... G06F 3/1245 |
| 2021/0096792 | A1* | 4/2021  | Chew .................... G06F 3/1231 |
| 2021/0240420 | A1* | 8/2021  | Takahashi ............. G06F 3/1258 |
| 2022/0060524 | A1* | 2/2022  | Hanai ................... H04L 65/403 |

FOREIGN PATENT DOCUMENTS

| EP | 3567465 A1 | 11/2019 |
| JP | 5806783 B2 | 11/2015 |

* cited by examiner

*Primary Examiner* — Eric A. Rust
(74) *Attorney, Agent, or Firm* — Canon U.S.A., Inc. IP Division

(57) ABSTRACT

A control method implemented in an information processing apparatus by at least one processor that executes print control software, the control method includes registering, in a print control software, a print queue in which first identification information is set, determining whether a device in which the first identification information is set is present on a network to which an information processing apparatus is connected, in a case where the print queue in which the first identification information is set is registered in the print control software, and changing identification information of the print queue registered in the print control software from the first identification information to second identification information different from the first identification information, in a case where a device in which the first identification information is set is determined to be present on the network.

14 Claims, 9 Drawing Sheets

PRINTING WITHOUT USING PRINTER SPECIFIC SOFTWARE

BACKGROUND OF THE INVENTION

Field of the Invention

The present invention relates to a control method and an information processing apparatus.

Description of the Related Art

There is a technique of providing a standard printing function using an operating system (hereinafter referred to as the OS standard printing function), without using software specific to a printer (hereinafter referred to as the printer-specific driver) provided by a printer vendor (see Japanese Patent No. 5806783). The OS determines whether a printer supports the OS standard printing function based on information acquired from the printer, and transmits print data generated by the OS standard printing function to the printer if the printer supports the OS standard printing function.

SUMMARY OF THE INVENTION

According to an aspect of the present invention, a control method implemented in an information processing apparatus by at least one processor that executes print control software, the control method includes registering, in the print control software, a print queue in which first identification information is set, determining whether a device in which the first identification information is set is present on a network to which the information processing apparatus is connected, in a case where the print queue in which the first identification information is set is registered in the print control software, registering a virtual printer in which second information different from the first information is set, as a virtual printer to communicate with operating system (OS) standard print software, and changing identification information of the print queue registered in the print control software from the first identification information to the second identification information, in a case where the virtual printer in which the second information is set is registered.

Further features of the present invention will become apparent from the following description of exemplary embodiments with reference to the attached drawings.

DESCRIPTION OF THE EMBODIMENTS

There is a case where an operating system (OS) standard printing function is not supported by a printer and therefore the printer cannot interpret print data generated by the OS standard printing function. There is also a case where a user wants a printer to perform printing based on more detailed print settings than those of the OS standard printing function even when the OS standard printing function is supported by the printer.

An aspect of the present disclosure is directed to provision of a technique of enabling an appropriate print instruction to be issued using an OS standard printing function.

Exemplary embodiments of the present disclosure will be described in detail below with reference to the attached figures. The following exemplary embodiments are not intended to limit the scope of the invention as recited in the claims, and not all of combinations of features described in the exemplary embodiments are necessarily essential to the present invention.

Figure 1:
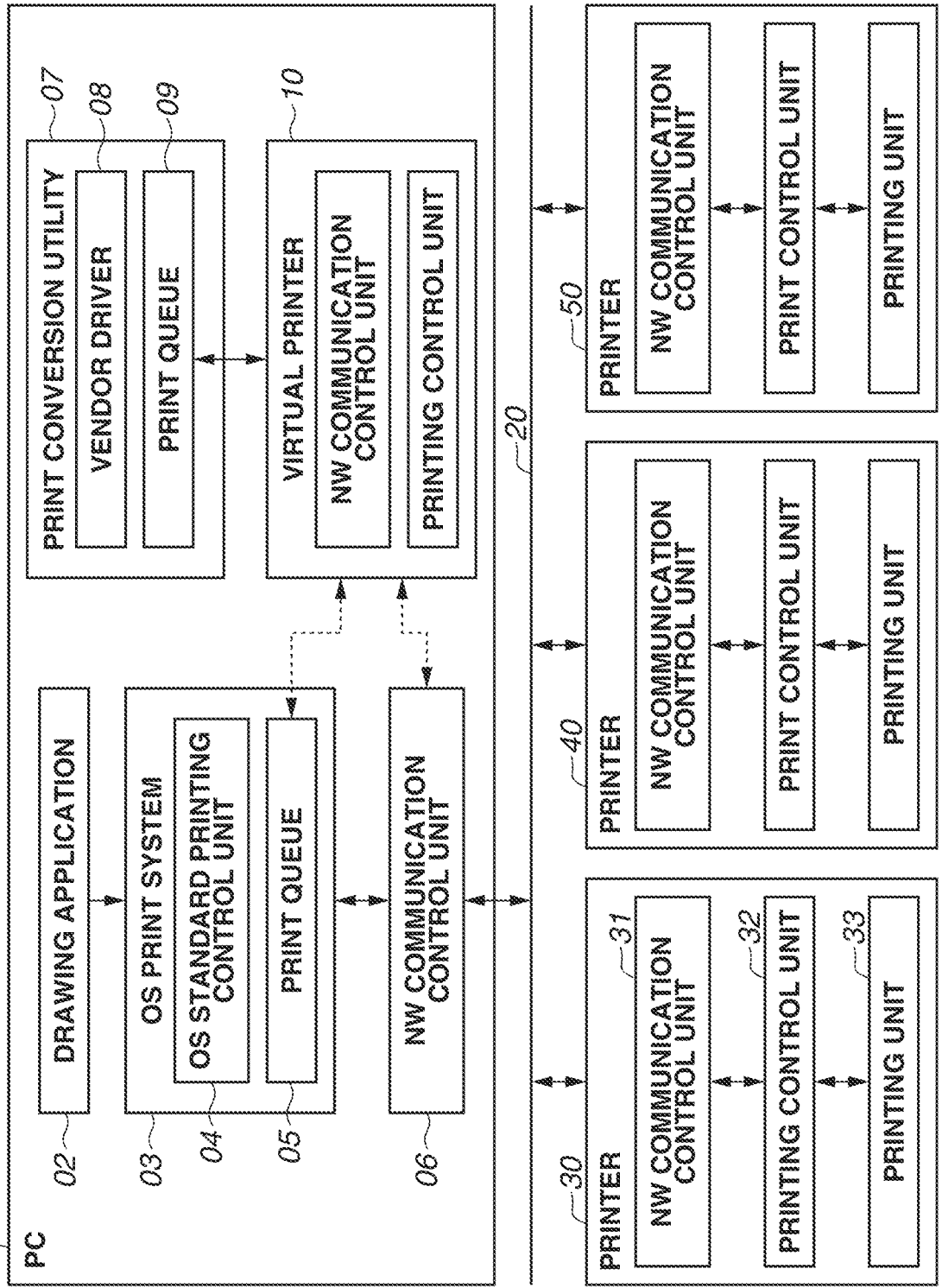
FIG. 1 is a diagram illustrating an overall configuration of a print system according to an exemplary embodiment.

FIG. 1 is a diagram illustrating an overall configuration of a print system according to a first exemplary embodiment. A personal computer (PC) 01 is connected to each of a printer 30, a printer 40, and a printer 50 via a network 20 to communicate with each of these printers. In the present exemplary embodiment, a local area network (LAN) is used as the network 20, but a wide area network (WAN) may be used instead. The connection configuration of the network may be wired or wireless, or a mixture of both. The PC 01 controls the printer 30, the printer 40, and the printer 50 connected via the network 20.

<Hardware Configuration>

Figure 9:
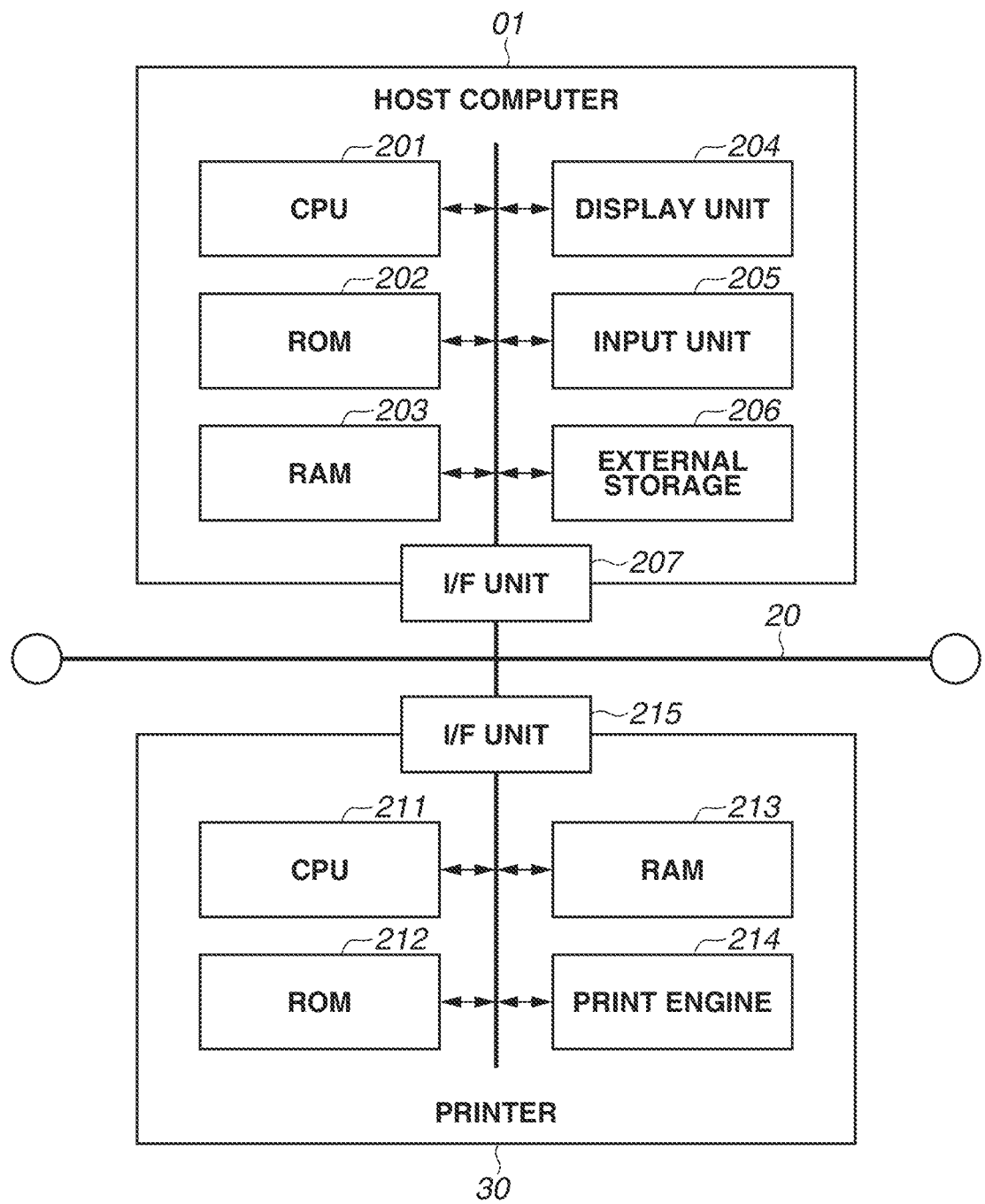
FIG. 9 is a block diagram illustrating a hardware configuration.

Here, a hardware configuration of the print system according to the present exemplary embodiment will be described with reference to a block diagram in FIG. 9. FIG. 9 illustrates an example of the print system in which the PC 01 serving as a host computer and the printer 30 can communicate with each other. FIG. 9 illustrates a hardware configuration of the printer 30, and the printer 40 and the printer 50 each have a hardware configuration similar thereto.

The PC 01 is an example of an information processing apparatus. The PC 01 includes a central processing unit (CPU) 201, a read only memory (ROM) 202, a random access memory (RAM) 203, a display unit 204, an input unit 205, an external storage 206, and an interface (I/F) unit 207. The PC 01 of the present exemplary embodiment may be a desktop PC, or any other type of apparatus, including a notebook PC, a tablet PC, and a smartphone.

The PC 01 transmits, for example, an instruction for controlling the printer 30, print data, and a setting command to the printer 30. The CPU 201 controls each component of the PC 01, and executes control programs such as an OS and a print conversion utility 07 to be described below. The ROM 202 stores the OS for controlling system operation. The RAM 203 is a memory in which a work area to be used by the CPU 201 is provided. The external storage 206 stores various control programs such as an application and the print conversion utility 07.

The input unit 205 is an input device including a keyboard and a mouse for operating the PC 01. The display unit 204 is a display device that displays information input from the input unit 205 for confirmation, user interface screens of the OS and the application, and messages. The I/F unit 207 is a communication module that transmits and receives data to and from the printer 30.

The printer 30 serving as a printing apparatus is, for example, an ink jet printer. The printer 30 includes a CPU 211, a ROM 212, a RAM 213, a print engine 214, and an I/F unit 215. The CPU 211 controls each of these components to be specifically described below. The ROM 212 stores a program for controlling the print engine 214. The RAM 213 temporarily stores a program for operation of the print engine 214 and data such as a set value received from the PC 01.

The print engine 214 performs printing on a print medium based on print data transmitted from the PC 01. The I/F unit 215 is a communication module that receives print data from the PC 01, and has functions such as a function of transmitting the current status information of the printer 30 from the printer 30 to the PC 01. The status information here is status data representing the state of the printer 30 and the status data can be transmitted from the printer 30 in response to a request from the PC 01 connected via the I/F unit 215. The status data is information for notifying an operation state of the printer 30 such as "printing in progress" or "standby state", and an error state of the printer 30 such as "out of paper", "cover is open", or "no remaining ink".

<Software Configuration of PC 01>

A software configuration of the PC 01 will be described with reference to FIG. 1. A drawing application 02, an OS print system 03, a network (NW) communication control unit 06, and the print conversion utility 07 are operably mounted inside the PC 01 serving as the information processing apparatus. Although not illustrated in FIG. 1, the OS is incorporated in the PC 01, and resources of the PC 01, e.g., each block in the PC 01, are managed by the OS. In the present exemplary embodiment, macOS® is used as the OS incorporated in the PC 01.

The drawing application 02 is software that generates drawing data based on a user instruction. The application here is software that can operate on the OS. Examples of the drawing application 02 include word-processing software for document creation, image editing software, and New Year's card creation software. Examples of the drawing data generated by the drawing application 02 include Portable Document Format (PDF) data.

In a case where a print request is made, the drawing application 02 outputs the generated drawing data to the OS print system 03. Based on the acquired drawing data and information about print settings, the OS print system 03 generates a print job. The generated print job is input to a print queue 05 of the OS standard printing function. The print settings can be input beforehand by a user in a setting screen (to be described below with reference to FIG. 4) provided by the OS print system 03. The information about print settings includes information such as paper size, paper type, and information indicating which print queue is to be used for printing. The OS print system 03 sequentially processes a print request from the drawing application 02 as a job for each printer connected to the PC 01.

The OS print system 03 is OS standard print software having a standard function for print data generation (the OS standard printing function). The OS print system 03 spools the drawing data generated by the drawing application 02, and generates print data in a predetermined format (hereinafter may also be referred to as "standard format") conforming to the OS standard printing function. A printer supporting the OS standard printing function can interpret print data in the standard format. Therefore, the OS print system 03 transmits the generated print data to the printer supporting the OS standard printing function via the NW communication control unit 06.

Further, the OS print system 03 acquires device model information of the printer via the NW communication control unit 06 to determine whether the printer supports the OS print system 03. The information to be acquired for support determination is not limited to the device model information of the printer and may be other kind of information such as capability information of the printer. Various types of processing in the OS print system 03 are controlled by an OS standard printing control unit 04 in the OS print system 03.

The print conversion utility 07 is print control software for enabling a print instruction to be issued using the OS standard printing function to a printer not supporting the OS standard printing function, and is installed on the PC 01 as appropriate. The print conversion utility 07 has a function of converting print data in the standard format into print data in a format specific to a printer vendor. This function will be hereinafter referred to as "vendor driver 08", but the vendor driver 08 may not be a function equivalent to that of the conventional printer-specific driver, and may be sufficient if the vendor driver 08 has at least a function of converting print data into print data in a format specific to a printer vendor. After the print data is converted by the print conversion utility 07 into the print data in the format specific to the printer vendor, the converted print data is transmitted to the printer not supporting the OS standard printing function via the NW communication control unit 06.

The printer not supporting the OS standard printing function cannot interpret the print data in the standard format generated by the OS print system 03, even if the print data in the standard format is received by this printer. Therefore, in the present exemplary embodiment, the print conversion utility 07 converts the print data in the standard format into the print data in the format specific to the printer vendor that can be interpreted by the printer. The printer not supporting the OS standard printing function is thereby enabled to perform printing using the standard function of the OS print system 03.

Specifically, in the case of a print job for the printer not supporting the OS standard printing function, the OS print system 03 transmits the generated print data in the standard format to a virtual printer 10 activated by the print conversion utility 07. The virtual printer 10 can act as a printer supporting the OS standard printing function via a NW communication control unit, and receive a print job of the OS standard printing function. In other words, the OS print system 03 regards the virtual printer 10 as the printer supporting the OS standard printing function, and outputs the print job to the virtual printer 10. The print conversion utility 07 converts the print data in the standard format received by the virtual printer 10 into print data in the format specific to the printer vendor, and transmits the converted print data to the printer via the NW communication control unit 06. In FIG. 1, the virtual printer 10 is separate from the print conversion utility 07. However, in the present exemplary embodiment, the virtual printer 10 may be provided as one function of the print conversion utility 07. Further, although the virtual printer 10 is present in the same PC as the PC provided with the OS print system 03, the virtual printer 10 may be present in a different server or PC.

The print conversion utility 07 may be used if a print instruction is issued for a printer supporting the print conversion utility 07, even in a case where the printer supports the OS print system 03 (i.e., even in a case where the printer can interpret print data in the standard format). More functions can be provided by using the print conversion utility 07. For example, the OS standard function provided by the OS print system 03 does not support detailed print quality settings such as color matching processing and adjustments to tint and brightness. In other words, the OS standard printing function is limited. However, a function equivalent to a printer driver specific to a printer vendor can be provided by using the print conversion utility 07.

Here, in order to use the print conversion utility 07 from the drawing application 02, it may be desirable to register both of the print queue 05 included in the OS print system 03 for receiving a print request from the drawing application 02, and a print queue 09 included in the print conversion utility 07. The print queue 09 included in the print conversion utility 07 is a queue for controlling print data output from the virtual printer 10. Without both of these print queues being registered, the drawing application 02 cannot convert print data using the print conversion utility 07. Registering the print queue 09 of the print conversion utility 07 enables the print conversion utility 07 to activate the virtual printer 10. Subsequently, the print conversion utility 07 designates the virtual printer 10 and automatically registers the print queue 05 in the OS print system 03.

The print queue 09 of the print conversion utility 07 is stored in a storage area for each user. In other words, the print queue 09 of the print conversion utility 07 for a user A and the print queue 09 of the print conversion utility 07 for a user B are registered in the respective storage areas different from each other. On the other hand, the print queue 05 of the OS print system 03 is stored in a common area in the system. In other words, the print queue 05 of the OS print system 03 is shared by the user A and the user B. The print queue 05 of the OS print system 03 may be hereinafter referred to as the print queue 05 of the OS standard printing function.

<Software Configuration of Printer>

The printer 30, the printer 40, and the printer 50 each include a NW communication control unit 31, a printing control unit 32, and a printing unit 33. The printing control unit 32 receives print data from the PC 01 via the NW communication control unit 31 and controls the printing unit 33 based on the print data to execute printing. In the present exemplary embodiment, the printer 30 and the printer 40 do not support the OS standard printing function, and the printer 50 supports the OS standard printing function. The printer may be an inkjet printing apparatus, or may be an electrophotographic printing apparatus.

<Registration of Print Queue in Print Conversion Utility>

Next, transition of screens to be displayed in the PC 01 will be described to illustrate the flow of the registration of the print queue 09 of the print conversion utility 07.

Figure 2:
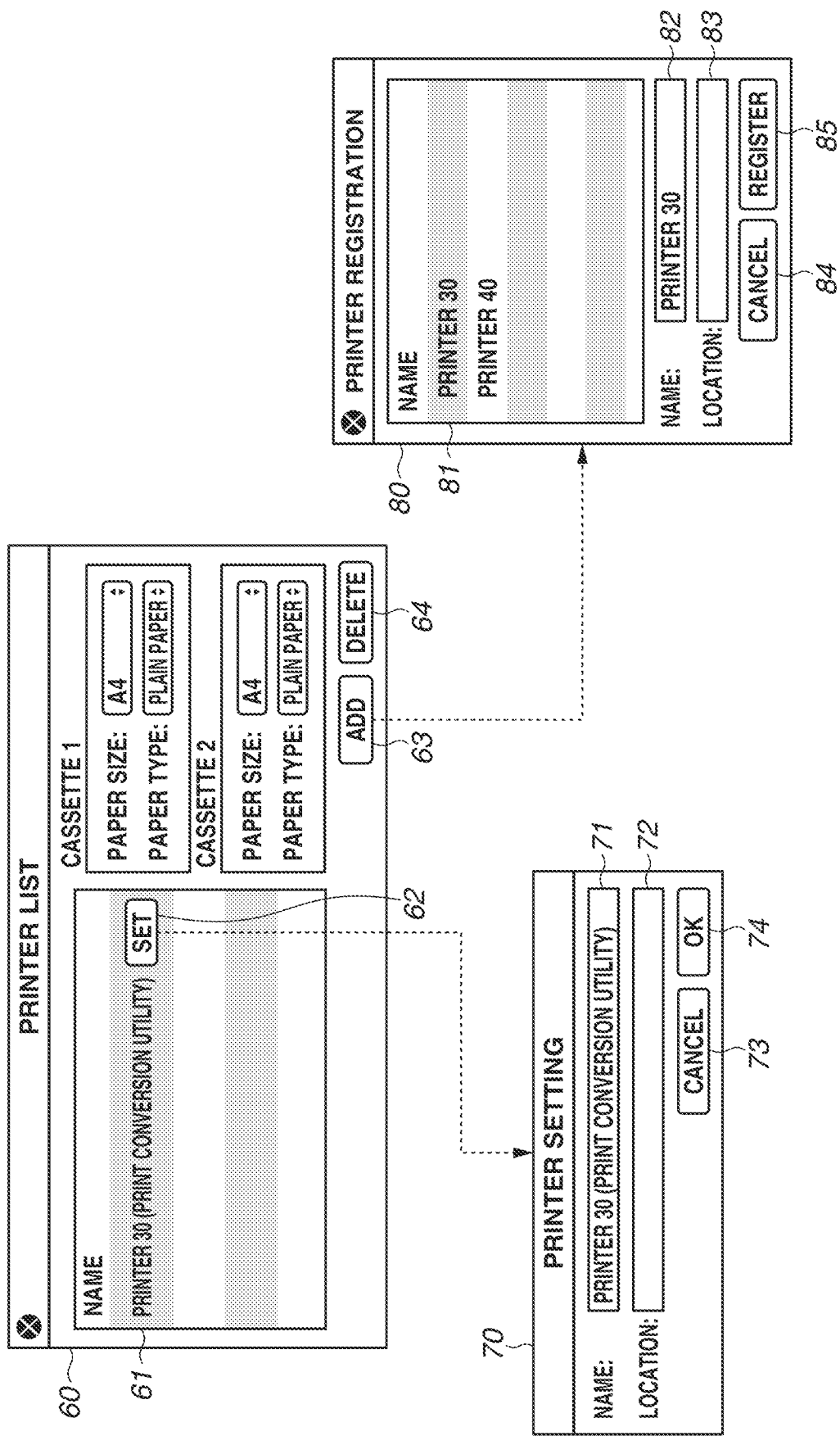
FIG. 2 is a schematic diagram illustrating a printer list screen, a printer registration screen, and a printer setting screen of a print conversion utility.

FIG. 2 illustrates a printer list screen 60 to be provided by the print conversion utility 07. The printer list screen 60 includes a name 61 of a printer registered in the print conversion utility 07, a "set" button 62 for setting a printer, an "add" button 63 for registering a printer, and a "delete" button 64 for deleting a printer. In FIG. 2, there is illustrated a state where "printer 30 (print conversion utility)" is displayed as the name 61 of the printer, and a print queue of the printer 30 is already registered in the print conversion utility 07. The words "(print conversion utility)" added to the end of the "printer 30" indicates that the printer 30 supports the OS standard printing function via the print conversion utility 07.

When the user presses the "set" button 62 of the printer list screen 60, the print conversion utility 07 opens a printer setting screen 70. The printer setting screen 70 includes a printer name edit field 71, a printer setup location edit field 72, a "cancel" button 73, and an "OK" button 74. The print conversion utility 07 displays name information of the print queue 09 currently registered in the print conversion utility 07 and setup location information of the printer in the printer name edit field 71 and the printer setup location edit field 72, respectively. In the printer setting screen 70, the user can edit the contents displayed in the printer name edit field 71 and the printer setup location edit field 72. When the user presses the "OK" button 74, the print conversion utility 07 updates the setting information of the print queue 09 of the print conversion utility 07 based on the contents of the printer name edit field 71 and the printer setup location edit field 72. When the user presses the "cancel" button 73, the print conversion utility 07 closes the printer setting screen 70.

When the user presses the "add" button 63 of the printer list screen 60, the print conversion utility 07 opens a printer registration screen 80. The printer registration screen 80 includes a printer list 81. The printer list 81 displays all printers connected to the PC 01 and not supporting the OS standard function. Here, the printer 30 and the printer 40 which do not support the OS standard printing function are displayed. When a printer is selected in the printer list 81, the name of the selected printer is displayed in a printer name text field 82, and the setup location of the selected printer is displayed in a printer setup location text field 83. When the user presses a "register" button 85, the print queue 09 of the printer currently selected in the printer list 81 is registered in the print conversion utility 07 as a new print queue, based on the contents input in the printer name text field 82 and the printer setup location text field 83.

When the print queue of the printer is registered in the print conversion utility 07, the print conversion utility 07 adds support information for the OS standard printing function generated inside based on information about the registered printer and activates the virtual printer 10. Specifically, the print conversion utility 07 activates the virtual printer 10, based on the information about the printer (the model name, the name of the printer, and the setup location information of the printer) and the support information (a universally unique identifier (UUID) and capability information). The print conversion utility 07 thereby newly registers the virtual printer 10 which is associated with the registered print queue 09 and in which the same name as the name (identification information) of the registered print queue 09 is set. The virtual printer 10 can then start responding to the OS print system 03. At the time of registration, the words "print conversion utility" are added to the name of the print queue 09 of the print conversion utility 07 and the name of the virtual printer 10. When the print queue 09 is registered in the print conversion utility 07 and the virtual printer 10 associated with the print queue 09 is activated, the print conversion utility 07 executes a registration command for the print queue 05 of the OS standard printing function, based on the information returned to the OS print system 03. The print queue 05 is automatically registered in the OS print system 03 as well by this processing, without the intervention of a user operation on a screen of the OS print system 03.

When the user presses the "delete" button 64 in the printer list screen 60, the print conversion utility 07 deletes the print queue 09 of the print conversion utility 07 of the selected printer. Further, the print conversion utility 07 stops the virtual printer 10 associated with the deleted print queue 09. In other words, the print conversion utility 07 deletes the virtual printer 10 associated with the deleted print queue 09. Furthermore, the print conversion utility 07 executes a delete command for the print queue 05 of the OS standard printing function, thereby deleting the print queue 05 of the OS standard printing function. The registration and the deletion of the print queue 05 of the OS standard printing function can be manually performed from the OS print system 03 to be described below.

<Registration of Print Queue in OS Print System>

Figure 3:
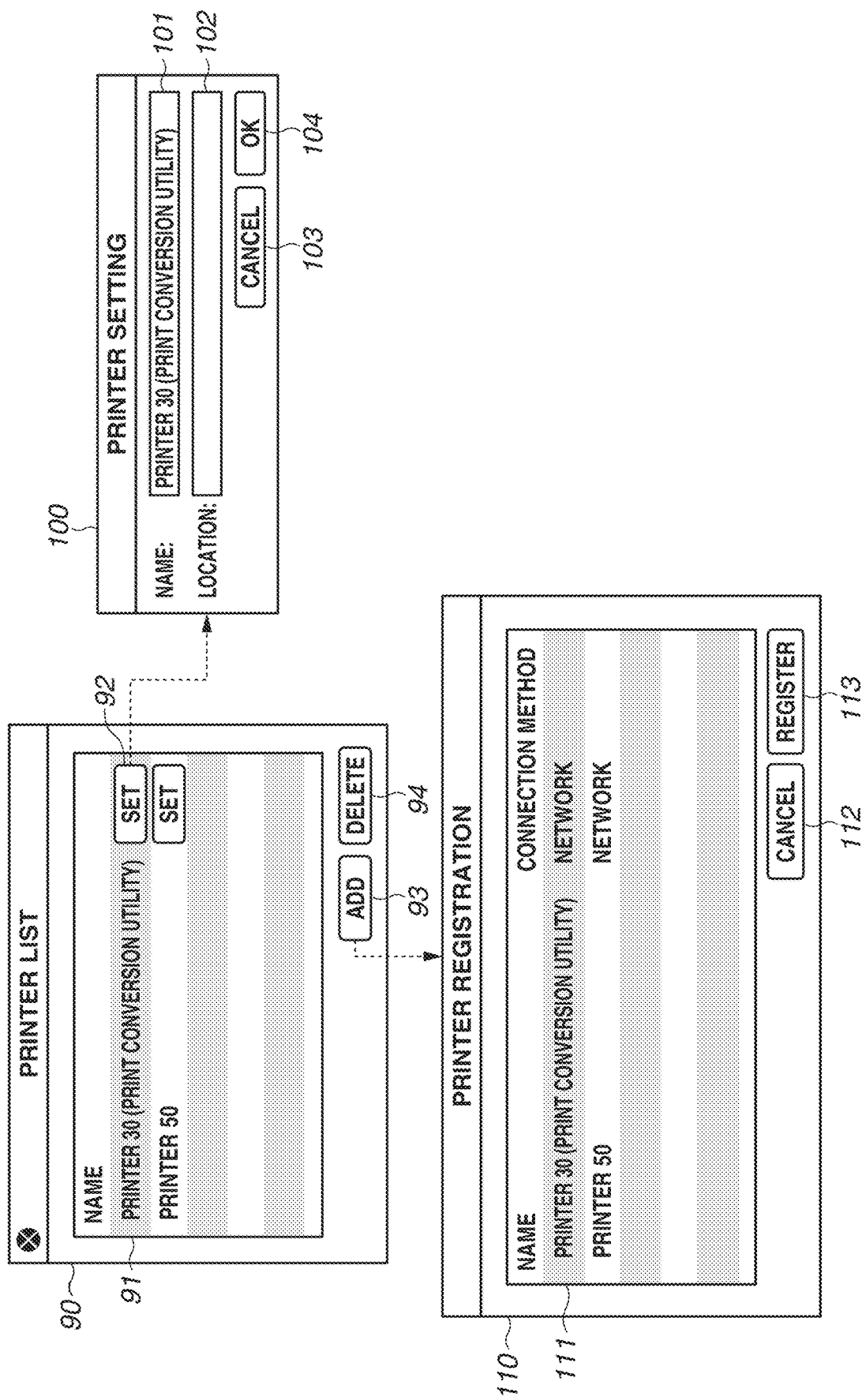
FIG. 3 is a schematic diagram illustrating a printer list screen and a printer registration screen of an operating system (OS) print system.

Next, transition of screens to be displayed in the PC 01 will be described to illustrate the flow of the registration of the print queue 05 of the OS print system 03. FIG. 3 is a diagram illustrating a printer list screen 90 to be provided by the OS print system 03. The printer list screen 90 includes a print-capable printer list 91 that displays all printers that can be selected in printing. When the user selects a printer in the print-capable printer list 91 and presses a "set" button 92, the OS print system 03 displays a printer setting screen 100.

The printer setting screen 100 includes a printer name edit field 101, a printer setup location edit field 102, a "cancel" button 103, and an "OK" button 104. The print conversion utility 07 displays name information of the print queue 05 of a printer currently registered in the OS standard printing function and setup location information thereof in the printer name edit field 101 and the printer setup location edit field 102, respectively. In the printer setting screen 100, the user can edit the contents displayed in the printer name edit field 101 and the printer setup location edit field 102. When the user presses the "OK" button 104, the OS print system 03 updates the setting information of the print queue 05 of the OS standard printing function based on the contents of the printer name edit field 101 and the printer setup location edit field 102. When the user presses the "cancel" button 103, the OS print system 03 closes the printer setting screen 100. When the user presses a "delete" button 94, the OS print system 03 deletes the print queue of the selected printer and also deletes this printer from the print-capable printer list 91.

When the user presses an "add" button 93 in the printer list screen 90, the OS print system 03 displays a printer registration screen 110. The printer registration screen 110 includes a registration printer list 111 that displays all printers connected to the PC 01 and supporting the OS standard printing function. Here, from the printer 50 connected to the PC 01 and supporting the OS normal printing function, the OS print system 03 acquires the name and capability information including support information for the OS normal printing function of the printer 50, and displays information in the registration printer list 111 based on the acquired information. Further, the OS print system 03 also acquires the name and capability information of the virtual printer 10 activated by the print conversion utility 07 from the virtual printer 10. Here, the printer 30 is an operation target of the print conversion utility 07, and the virtual printer 10 corresponding to the printer 30 is activated (registered). Therefore, the OS print system 03 acquires the capability information of the virtual printer 10 corresponding to the printer 30 and activated by the print conversion utility 07 from the virtual printer 10, and displays information in the registration printer list 111 based on the acquired capability information. The OS print system 03 displays a virtual printer name "printer 30 (print conversion utility)" as the name of the printer 30, and "Network" as a connection method, in the registration printer list 111.

When the user selects a printer from the registration printer list 111 and presses a "register" button 113 in the printer registration screen 110, the OS print system 03 generates the print queue 05 of the selected printer in the OS print system 03, and closes the printer registration screen 110. When the user presses a "cancel" button 112, the OS print system 03 closes the printer registration screen 110 without registering the print queue of a printer.

The printer list screen 90 in FIG. 3 displays a state where the print queue of the printer 30 and the print queue of the printer 50 are registered in the OS print system 03. Although the printer 30 does not support the OS standard printing function, the virtual printer 10 corresponding to the printer 30 exists as a result of the registration of the print queue of the printer 30 in the print conversion utility 07. In this way, the OS print system 03 acquires the name and capability information of the virtual printer 10 corresponding to the printer 30 from the virtual printer 10, and thereby registers the print queue of the virtual printer 10 in the OS print system 03. The name of the virtual printer 10 is the same name as the name of the print queue registered in the print conversion utility 07, as described with reference to FIG. 2. Therefore, the OS print system 03 can be regarded as having the print queue of the printer 30 registered therein, by having the print queue of the virtual printer 10 corresponding to the printer 30 registered therein.

<Print Setting Screen>

Figure 4:
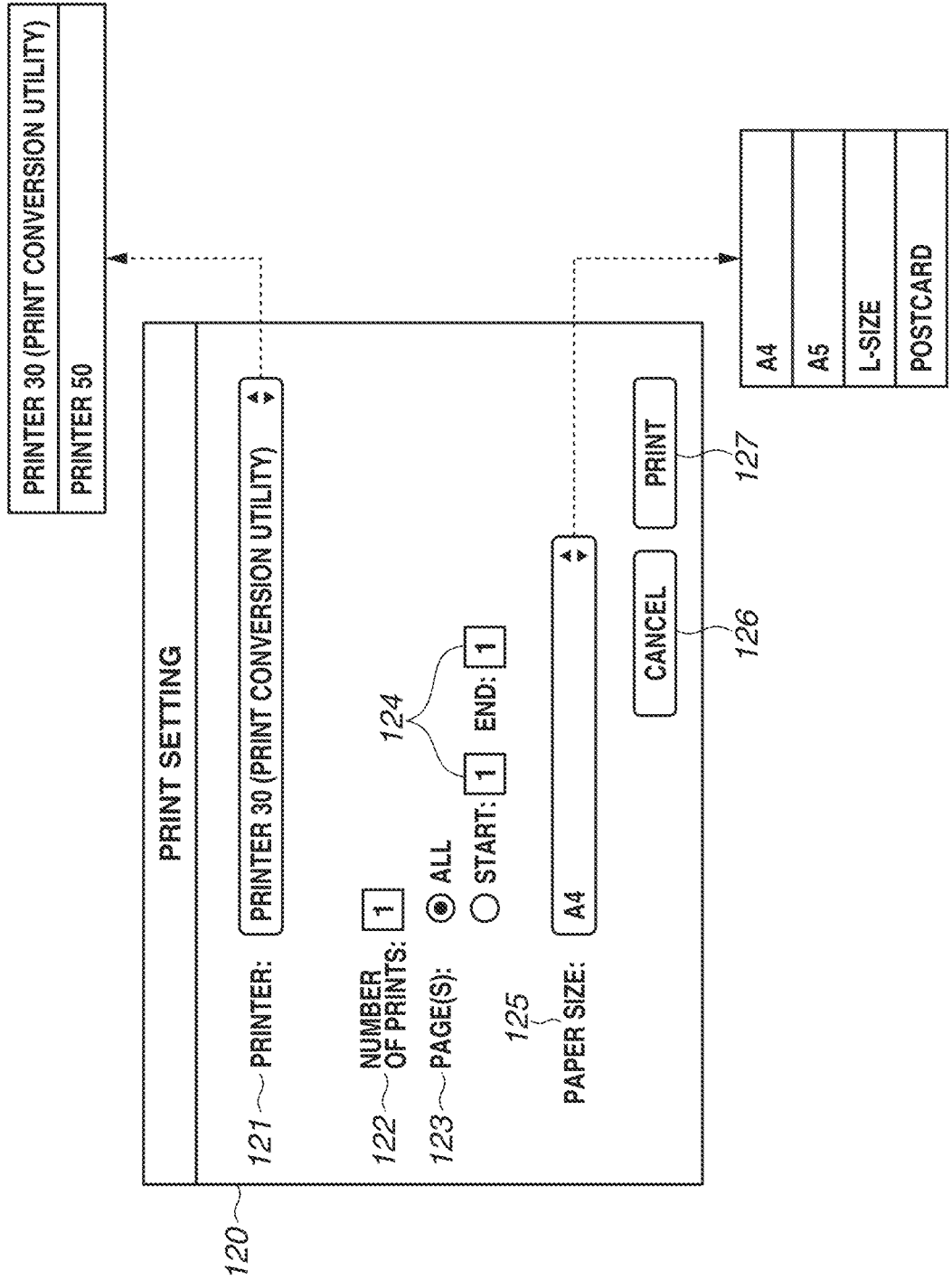
FIG. 4 is a schematic diagram illustrating a print setting screen of the OS print system.

FIG. 4 is a diagram illustrating a print setting screen 120 of the OS print system 03. The print setting screen 120 is a screen for the user to make print settings for printing data generated in the drawing application 02.

The user can designate a printer for printing in a printer selection pop-up menu 121. The OS print system 03 displays the printers registered in the printer list screen 90 illustrated in FIG. 3, as printers that can be selected. In the present exemplary embodiment, the printer 30 regarded as supporting the OS standard printing function artificially by the intervention of the print conversion utility 07 and the printer 50 supporting the OS standard printing function are registered as the printers that can be selected. Therefore, these are displayed in the printer selection pop-up menu 121. The user can set the number of prints in a number-of-prints setting text field 122. The user can set a page (pages) to be printed, using a page setting radio button 123 and a page designation text field 124. The user can set a paper size for printing in a paper size setting pop-up menu 125. The user can set the paper size of any of A4, A5, L-size, and postcard that can be printed by the printer. When the user presses a print button 127, the OS print system 03 inputs a print job based on the settings in this screen and closes this screen. When the user presses a cancel button 126, the OS print system 03 closes this screen without inputting a print job.

As described above, in the case of the printer not supporting the OS standard printing function, a default value for the name of a print queue to be registered in the OS print system 03 is the name (identification information) of the virtual printer 10 associated with this printer. This virtual printer 10 is associated with the print queue of the print conversion utility 07. In other words, the default name of the virtual printer 10 is the name of the print queue of the print conversion utility 07.

Here, in the present exemplary embodiment, in a case where the name of the print queue 09 of the print conversion utility 07 is set and subsequently the virtual printer 10 is activated using the set name, it is determined whether a device (here, a printer) having the same name as the name after the change is already present on the network to which the PC 01 is connected. In order for the OS print system 03 to identify a printer that can use the OS standard printing function, it may be desirable that there is only one printer by the same name on the network to which the PC 01 is connected. Therefore, in a case where a device (here, a printer) having the same name as the name of the virtual printer 10 is already present on the network, a number is added to the end of the name of the virtual printer 10 to differentiate it from the name of the existing device, in accordance with a discovery protocol.

However, in such a case, the name of the virtual printer 10 and the name of the print queue 09 of the print conversion utility 07 are different, so that it is difficult for the user to determine these are the same. Considering this point, in the present exemplary embodiment, in a case where the name of the activated virtual printer 10 is present on the network, the name of the print queue 09 of the print conversion utility 07 associated with the virtual printer 10 having the changed name is updated.

Figure 5:
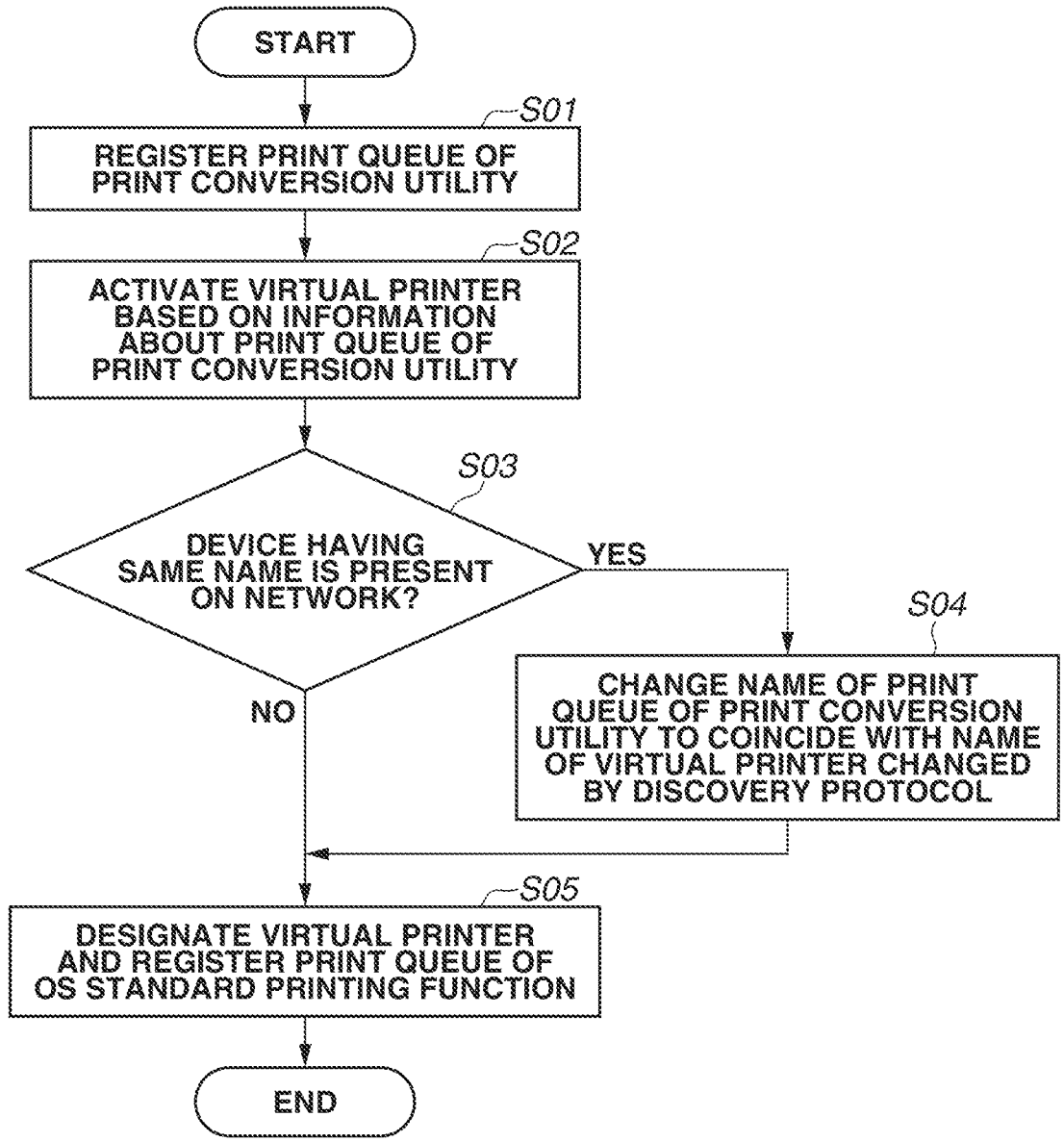
FIG. 5 is a flowchart illustrating print queue re-registration processing to be performed by the print conversion utility.

The details of the above-described processing will be described below with reference to FIG. 5. FIG. 5 is a flowchart illustrating the flow of registration processing of the print conversion utility 07. The flow in FIG. 5 begins in response to the activation of the print conversion utility 07 by the user. In FIG. 5, the print conversion utility 07 is to be activated, and the name of the print queue 09 registered in the print conversion utility 07 is to be set. The print conversion utility 07 will be hereinafter described to perform each step of the processing, but, actually, the CPU 201 executes the corresponding program to implement the corresponding function. All the steps are not necessarily executed sequentially in one process, and the processing can be shifted to the OS side once and called from the OS again. The flow in FIG. 5 illustrates main processing of the print conversion utility 07 in a simple manner for convenience.

In step S01, the print conversion utility 07 registers the print queue 09 of the print conversion utility 07 using the set name.

In step S02, the print conversion utility 07 activates the virtual printer 10, based on the information (the model name, the name of the printer, the setup location information of the printer) about the print queue 09 of the print conversion utility 07 and the support information (the UUID and the capability information).

In step S03, the print conversion utility 07 determines whether the name of the activated virtual printer 10 has been changed by the discovery protocol. Specifically, first, the print conversion utility 07 determines whether a device having the same name as the name to be set in the activated virtual printer 10 is present on the network to which the PC 01 is connected. In a case where the print conversion utility 07 determines that a device having the same name is present on the network, a number is added to the end of the name of the virtual printer 10 in accordance with the discovery protocol to avoid giving the same name. For example, suppose "printer 50", not "printer 30 (print conversion utility)", is set in step S01 as the name of the print queue 09 of the printer 30 registered in the print conversion utility 07. In this case, the name of the virtual printer 10 is also "printer 50", but the name "printer 50" is already assigned to the printer 50 present on the network to which the PC 01 belongs. Therefore, in such a case, the number 2 is added to the end of the name, so that the virtual printer 10 is given the name "printer 50 (2)". If the name of the virtual printer 10 is changed (YES in step S03), the processing proceeds to step S04. The determination as to whether a device having the same name is present on the network may be performed based on a device name (e.g., a Bonjour name) included in information transmitted from each device.

In step S04, the print conversion utility 07 changes the name of the print queue 09 of the print conversion utility 07 to coincide with the name of the virtual printer 10 changed in step S03. For example, in a case where the name of the virtual printer 10 is changed to "printer 50 (2)" in step S03, the name of the print queue 09 of the print conversion utility 07 is also changed to "printer 50 (2)".

In step S05, the print conversion utility 07 designates the virtual printer 10 having the name set in step S03 and executes processing for registering the print queue 05 of the OS standard printing function. For example, in a case where the name of the virtual printer 10 is changed to "printer 50 (2)" in step S03, the print conversion utility 07 registers the print queue 05 having a name "printer 50" (2) in the OS print system 03, as the print queue 05 associated with this virtual printer 10.

In the present exemplary embodiment, in a case where the name of the virtual printer 10 activated by the print conversion utility 07 is changed by the discovery protocol, this name is reflected in the name of the print queue 09 of the print conversion utility 07 by the above-described processing. The name of the print queue 09 of the print conversion utility 07, the name of the virtual printer 10, and the name of the print queue 05 of the OS standard printing function thereby coincide. This makes it easier for the user to identify a printer for printing and produces an effect of enabling an appropriate print instruction to be issued. In the above-described example, step S03 is executed after step S02, but the present exemplary embodiment is not limited to this order. Whether a device having the same name is present on the network may be determined before the virtual printer 10 is activated. Subsequently, in a case where a device having the same name is determined to be present on the network, the virtual printer 10 may be activated using the name after the change.

Next, a second exemplary embodiment of the present disclosure will be described. In the following description, points common to the first exemplary embodiment will not be described, and only a different point will be described. In the present exemplary embodiment, the print conversion utility 07 notifies the user that a network device having the same name already exists.

Figure 6:
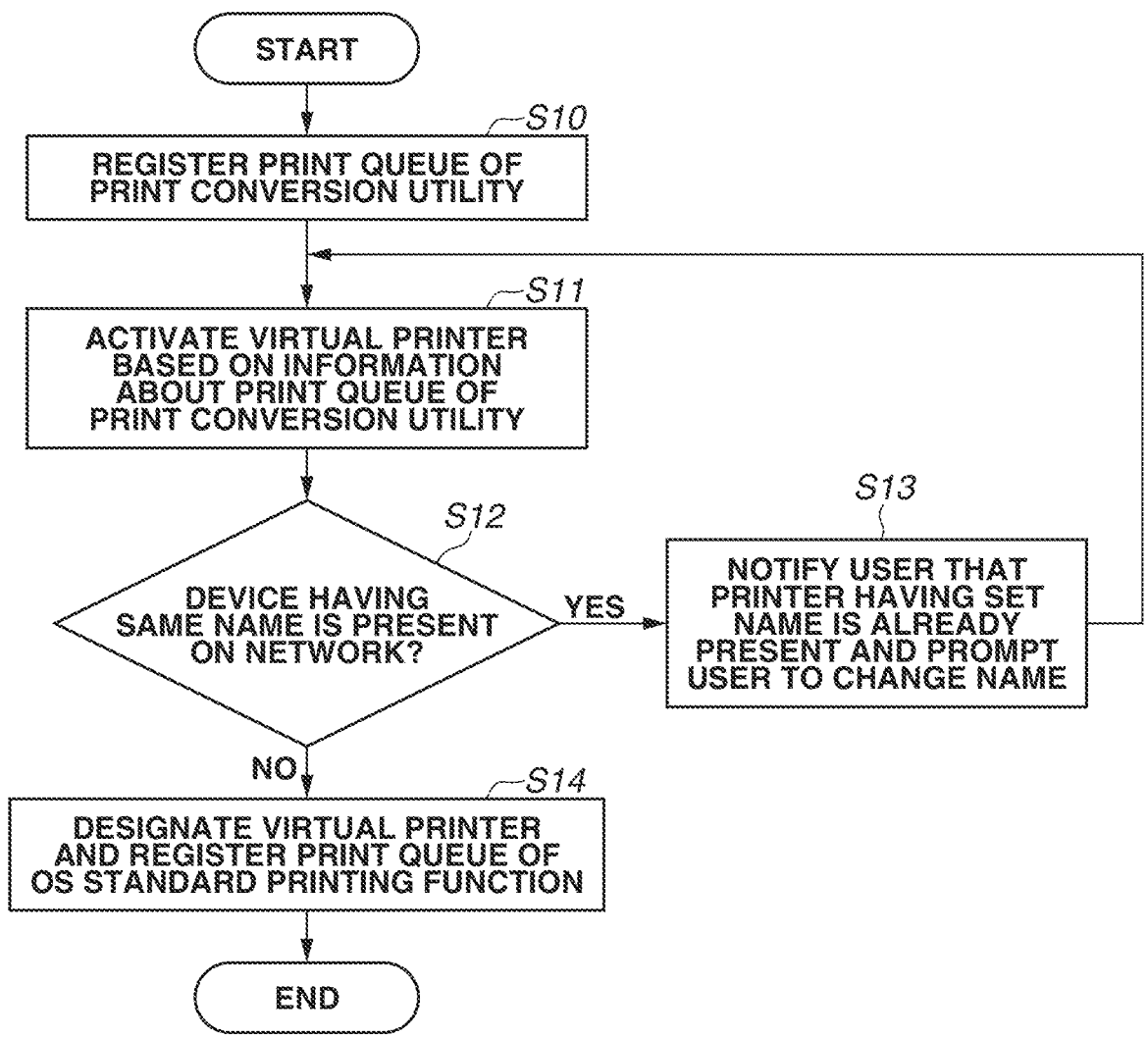
FIG. 6 is a flowchart illustrating print queue re-registration processing to be performed by the print conversion utility.

The details of the above-described processing will be described below with reference to FIG. 6. FIG. 6 is a flowchart illustrating the flow of registration processing for the print queue of the print conversion utility 07. The flow in FIG. 6 begins in response to the activation of the print conversion utility 07 by the user. In FIG. 6, the print conversion utility 07 is to be activated, and the name of the print queue 09 registered in the print conversion utility 07 is to be set. The print conversion utility 07 will be hereinafter described to perform each step of the processing, but, actually, the CPU 201 executes the corresponding program to implement the corresponding function. All the steps are not necessarily executed sequentially in one process, and the processing can be shifted to the OS side once and called from the OS again. The flow in FIG. 6 is only a flow illustrating main processing of the print conversion utility 07 in a simple manner for convenience.

Step S10 to step S12 in FIG. 6 are similar to step S01 to step S03 in FIG. 5 of the first exemplary embodiment and thus will not be described. For example, suppose "printer 50", not "printer 30 (print conversion utility)", is set in step S10 as the name of the print queue 09 of the printer 30 registered in the print conversion utility 07. In this case, the name of the virtual printer 10 is also "printer 50", but the name "printer 50" is already assigned to the printer 50 present on the network to which the PC 01 belongs. Therefore, in such a case, the result of the determination in step S12 is YES, and the processing proceeds to step S13.

Figure 7:
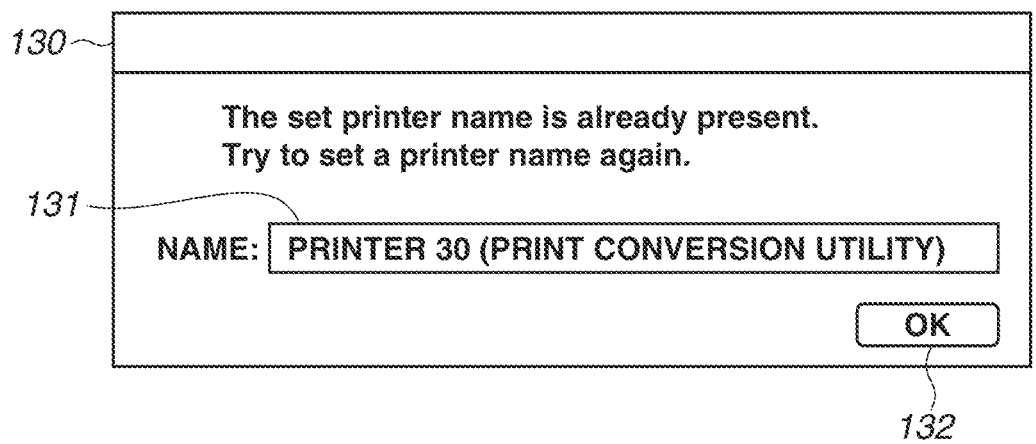
FIG. 7 is a schematic diagram illustrating a screen for prompting a user to change a printer name.

In step S13, the print conversion utility 07 displays a printer name edit screen 130 illustrated in FIG. 7. The printer name edit screen 130 includes a message for notifying the user that a printer having the set name is already present. The printer name edit screen 130 further includes a printer name edit text field 131 that displays the currently set name of the print queue 09 of the print conversion utility 07. The printer name edit text field 131 is an input item that enables the user to edit the input printer name (a user input), based on a message prompting the user to change the name in the printer name edit screen 130. When the user presses an "OK" button 132 in the printer name edit screen 130, the print conversion utility 07 changes the name of the print queue 09 of the print conversion utility 07 based on the content of the printer name edit text field 131.

The above-described processing is repeated until the name of the virtual printer 10 does not coincide with the name of a network device (here, a printer) present on the network. For example, suppose "printer 30 (print conversion utility)" is set in step S10 as the name of the print queue 09 of the printer 30 registered in the print conversion utility 07. In this case, the name of the virtual printer 10 is also "printer 30 (print conversion utility)", and this name is different from that of any other printer present on the network to which the PC 01 belongs. Therefore, in such a case, the result of the determination in step S12 is NO, and the processing proceeds to step S14.

In step S14, the print conversion utility 07 designates the virtual printer 10 activated in step S11, and executes processing for registering the print queue 05 of the OS standard printing function. For example, the print conversion utility 07 registers the print queue 05 having the name "printer 30 (print conversion utility)" in the OS print system 03, as the print queue 05 associated with the virtual printer 10 having the name "printer 30 (print conversion utility)".

As described above, in the present exemplary embodiment, the print conversion utility 07 notifies that the name of the registered print queue 09 of the print conversion utility 07 is already present on the network. This notification enables the user to change the name of the print queue 09 of the print conversion utility 07 again. According to the present exemplary embodiment, the name of the print queue 09 of the print conversion utility 07, the name of the virtual printer 10, and the name of the print queue 05 of the OS standard printing function coincide. Further, it is possible to avoid such a situation that the virtual printer 10 has a name not intended by the user, such as a name formed by adding a number to the end of the name of the virtual printer 10 in accordance with the discovery protocol. This makes it easier for the user to identify a printer for printing and produces an effect of enabling an appropriate print instruction to be issued. In the above-described example, step S12 is executed after step S11, but the present exemplary embodiment is not limited to this order. Whether a device having the same name is present on the network may be determined before the virtual printer 10 is activated. Subsequently, in a case where a device having the same name is determined to be present on the network, the user may be notified in step S13.

Next, a third exemplary embodiment of the present disclosure will be described. In the first exemplary embodiment and the second exemplary embodiment, the operation at the time of registration of the print queue 09 of the print conversion utility 07 is described. Here, the print conversion utility 07 is an application installed on the PC 01, and therefore, when the operation of the PC 01 terminates, the operation of the print conversion utility 07 also terminates. Alternatively, the user can terminate the operation of the print conversion utility 07. When the operation of the print conversion utility 07 terminates, the operation of the virtual printer 10 also terminates. Subsequently, when the print conversion utility 07 is activated again, the print conversion utility 07 reactivates the virtual printer 10 associated with the registered print queue 09 of the print conversion utility 07. At this moment, there is a possibility that the name of the reactivated virtual printer 10 is the same as the name of a network device present on the network. For example, there is a possibility that, in a case where the user connects a printer of the same model to the network by using another PC, the connected printer may be given the same network device name (hereinafter may also be referred to as the Bonjour name). In such a case, the name of the reactivated virtual printer 10 is changed by the discovery protocol. In the present exemplary embodiment, in such a case, the name of the print queue 09 of the print conversion utility 07 is changed, or the user is prompted to change the name of the print queue 09 of the print conversion utility 07 again.

Figure 8:
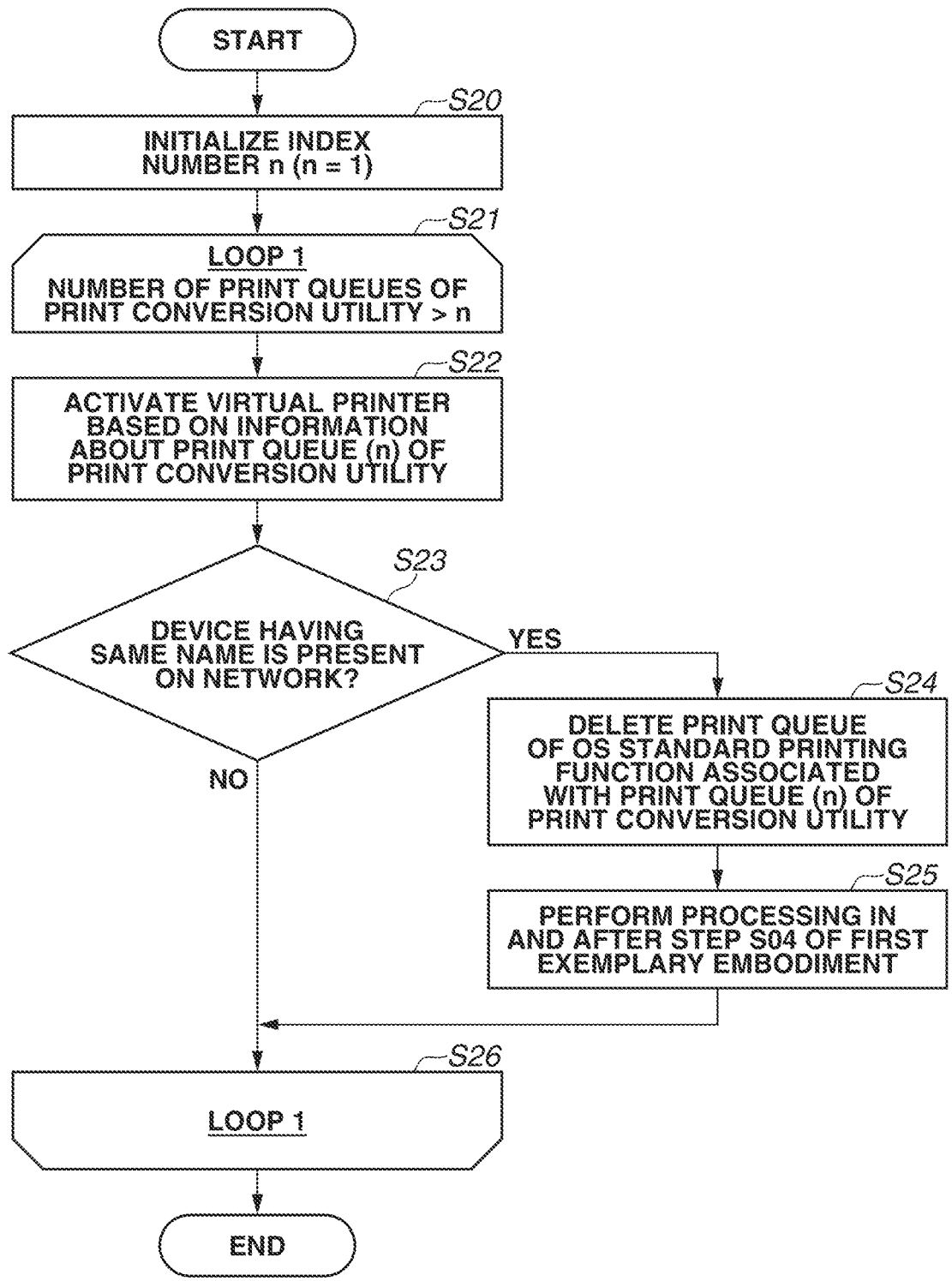
FIG. 8 is a flowchart illustrating print queue re-registration processing to be performed by the print conversion utility.

The details of the above-described processing will be described below with reference to FIG. 8. FIG. 8 is a flowchart illustrating the flow of registration processing of the print conversion utility 07. The flow in FIG. 8 begins in response to the activation of the print conversion utility 07 by the user. The print conversion utility 07 will be hereinafter described to perform each step of the processing, but, actually, the CPU 201 executes the corresponding program to implement the corresponding function. All the steps are not necessarily executed sequentially in one process, and the processing can be shifted to the OS side once and called from the OS again. The flow in FIG. 8 is only a flow illustrating main processing of the print conversion utility 07 in a simple manner for convenience.

In step S20, the print conversion utility 07 initializes an index number (n=1).

In step S21, the print conversion utility 07 starts a loop to be performed for the number of the print queues 09 registered in the print conversion utility 07.

In step S22, the print conversion utility 07 activates the virtual printer 10 associated with the nth print queue 09 of the print conversion utility 07, based on information about the nth print queue 09.

In step S23, the print conversion utility 07 determines whether the name of the virtual printer 10 activated in step S22 has been changed by the discovery protocol. Specifically, first, the print conversion utility 07 determines whether a device having the same name as the name to be set in the activated virtual printer 10 is present on the network to which the PC 01 is connected. In a case where the print conversion utility 07 determines that a device having the same name is present on the network, a number is added to the end of the name of the virtual printer 10 in accordance with the discovery protocol to avoid giving the same name.

In step S24, the print conversion utility 07 deletes the print queue 05 of the OS standard printing function associated with the nth print queue 09, and the processing proceeds to step S25.

In step S25, the print conversion utility 07 performs the processing in step S04 and step S05 in FIG. 5 of the first exemplary embodiment. Alternatively, the processing in and after step S13 in FIG. 6 of the second exemplary embodiment may be performed in step S25.

As described above, in the present exemplary embodiment, the print conversion utility 07 is controlled so that the activated virtual printer 10 does not have the same name as any other device on the network even at the time of the reactivation. Further, in a case where the name of the virtual printer 10 is changed, the print conversion utility 07 changes the name of the print queue 09 of the print conversion utility 07 and re-registers the print queue 05 of the OS standard printing function. The name of the print queue 09 of the print conversion utility 07, the name of the virtual printer 10, and the name of the print queue 05 of the OS standard printing function thereby coincide. This makes it easier for the user to identify a printer for printing and produces an effect of enabling an appropriate print instruction to be issued.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present disclosure provides a technique for enabling an appropriate print instruction to be issued using the OS standard printing function.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-015180, filed Jan. 31, 2020, which is hereby incorporated by reference herein in its entirety.

What is claimed is:

1. A control method implemented in an information processing apparatus by at least one processor that executes first software, the control method comprising:

registering, in the first software, a print queue in which first identification information is set;

determining whether a device in which the first identification information is set is present on a network to which the information processing apparatus is connected, in a case where the print queue in which the first identification information is set is registered in the first software;

changing identification information of the print queue registered in the first software from the first identification information to second identification information different from the first identification information, in a case where the device in which the first identification information is set is determined to be present on the network;

executing processing of registering, in second software different from the first software, a print queue of a virtual printer in which the second identification information is set, in a case where a device in which the second identification information is set is determined to be absent on the network.

2. The control method according to claim 1, wherein the virtual printer in which the second identification information is set is registered as a virtual printer to communicate with the second software and associated with the print queue, in a case where the device in which the first identification information is set is determined to be present on the network, and wherein the identification information of the print queue registered in the first software is changed from the first identification information to the second identification information, in a case where the virtual printer in which the second identification information is set is registered.

3. The control method according to claim 1, wherein the virtual printer, in which identification information formed by adding a number to an end of the first identification information is set as the second identification information, is registered in accordance with a discovery protocol, in a case where the device in which the first identification information is set is determined to be present on the network.

4. The control method according to claim 1, wherein an input item that receives a change of the identification information of the print queue registered in the first software is displayed in a case where the device in which the first identification information is set is determined to be present on the network, and wherein the virtual printer in which the second identification information is set is registered as a virtual printer to communicate with the second software and associated with the print queue, in a case where the identification information of the print queue registered in the first software is changed from the first identification information to the second identification information by a user input to the input item.

5. The control method according to claim 1, further comprising deleting a print queue in which the second identification information is set and which is registered in the second software, if a device in which the second identification information is set is determined to be present on the network in a case where the first software is activated.

6. The control method according to claim 1, wherein, in a case where a printing apparatus that communicates with the information processing apparatus does not support print data in a standard format, print data in the standard format generated by the second software is transmitted to the virtual printer to be converted by the first software into print data in a format interpretable by the printing apparatus.

7. The control method according to claim 1, wherein the first software is print control software, and the second software is operating system (OS) standard print software.

8. An information processing apparatus comprising:
- a first registration unit configured to register, in first software, a print queue in which first identification information is set;
- a determination unit configured to determine whether a device in which the first identification information is set is present on a network to which the information processing apparatus is connected, in a case where the print queue in which the first identification information is set is registered in the first software;
- a changing unit configured to change identification information of the print queue registered in the first software from the first identification information to second identification information different from the first identification information, in a case where the device in which the first identification information is set is determined to be present on the network; and
- an execution unit configured to execute processing of registering, in second software different from the first software, a print queue of a virtual printer in which the second identification information is set, in a case where a device in which the second identification information is set is determined to be absent on the network.

9. The information processing apparatus according to claim 8,
- wherein the virtual printer in which the second identification information is set is registered as a virtual printer to communicate with the second software and associated with the print queue, in a case where the device in which the first identification information is set is determined to be present on the network, and
- wherein the identification information of the print queue registered in the first software is changed from the first identification information to the second identification information, in a case where the virtual printer in which the second identification information is set is registered.

10. The information processing apparatus according to claim 8, wherein the virtual printer, in which identification information formed by adding a number to an end of the first identification information is set as the second identification information, is registered in accordance with a discovery protocol, in a case where the device in which the first identification information is set is determined to be present on the network.

11. The information processing apparatus according to claim 8,
- wherein an input item that receives a change of the identification information of the print queue registered in the first software is displayed in a case where the device in which the first identification information is set is determined to be present on the network, and
- wherein the virtual printer in which the second identification information is set is registered as a virtual printer to communicate with the second software and associated with the print queue, in a case where the identification information of the print queue registered in the first software is changed from the first identification information to the second identification information by a user input to the input item.

12. The information processing apparatus according to claim 8, further comprising a deletion unit configured to delete a print queue in which the second identification information is set and which is registered in the second software, in a case where a device in which the second identification information is set is determined to be present on the network, in a case where the first software is activated.

13. The information processing apparatus according to claim 8, wherein, in a case where a printing apparatus that communicates with the information processing apparatus does not support print data in a standard format, print data in the standard format generated by the second software is transmitted to the virtual printer to be converted by the first software into print data in a format interpretable by the printing apparatus.

14. The information processing apparatus according to claim 8, wherein the first software is print control software, and the second software is operating system (OS) standard print software.

* * * * *